United States Patent [19]
Adler et al.

[11] 3,857,089
[45] Dec. 24, 1974

[54] MAGNETIC POSITION INDICATOR

[75] Inventors: Jason A. Adler, Costa Mesa; David R. Bartlett, Huntington Beach, both of Calif.

[73] Assignee: Royal Industries, Santa Ana, Calif.

[22] Filed: June 8, 1972

[21] Appl. No.: 261,009

[52] U.S. Cl.............................. 324/34 PS, 340/195
[51] Int. Cl............................................. G01r 33/00
[58] Field of Search........ 324/34 PS, 34 P; 340/282, 340/195, 196

[56] References Cited
UNITED STATES PATENTS

| | | | |
|---|---|---|---|
| 3,032,754 | 5/1962 | DiPietro | 324/34 PS |
| 3,183,496 | 5/1965 | Goldstein | 340/196 |

FOREIGN PATENTS OR APPLICATIONS

| | | | |
|---|---|---|---|
| 1,189,981 | 4/1970 | Great Britain | 324/34 D |

OTHER PUBLICATIONS

Wobschall, Rev. Sci. Instr., Jan 1961, p. 71–73.

Primary Examiner—Alfred E. Smith
Attorney, Agent, or Firm—Christie, Parker & Hale

[57] ABSTRACT

A position indicating system indicates the position of a ferromagnetic shaft which drives a moderator in a nuclear reactor and which is enclosed in a chamber. The system includes a plurality of magnetic transducers arranged at longitudinally spaced-apart locations adjacent to the outside of the chamber. The transducers have input coils individually excited by different phases of a multi-phase electrical source and have interconnected output coils providing an oscillating electrical signal that has a variable phase relative to a reference phase and that varies in phase as a function of the position of the shaft end.

11 Claims, 5 Drawing Figures

Fig_1

MAGNETIC POSITION INDICATOR

BACKGROUND OF THE INVENTION

1. Field of the Invention

In general, this invention relates to transducer systems. In particular, it relates to transducer apparatus for indicating the position of a movable member contained in a chamber separating the transducer apparatus from the movable member.

2. Description of the Prior Art

Prior art arrangements for indicating the position of a movable member include variable transformers having primary and secondary windings. In a common arrangement, the movable member is an elongated ferromagnetic shaft that translates along a line defined by its axis. The shaft has a travel defined by two opposite terminal positions. The primary and secondary windings are wound around the shaft travel. In a first terminal position, no section of the shaft occupies the shaft travel; in the opposite terminal position, a shaft section extending longitudinally from one end fully occupies the shaft travel; and in intermediate positions, the end section of the shaft occupies a portion of the shaft travel. In use, a sinusoidal reference voltage excites the primary winding to induce in the secondary winding a variable-amplitude sinusoidal indicating voltage having the same phase as or the opposite phase from the reference voltage. The amplitude of the indicating voltage varies as a function of the strength of the magnetic field coupling the primary and secondary windings. In turn, the magnetic field strength is a function of shaft position. When the shaft is in the first terminal position, its permeability does not aid the magnetic coupling, and, consequently, the indicating voltage amplitude is relatively low. When the shaft is in the opposite terminal position, its permeability maximizes the magnetic coupling, and, consequently, the indicating voltage amplitude is relatively high. When the shaft is in any intermediate position, the permeability of its end section augments the magnetic coupling, and, consequently, the indicating voltage amplitude is at an intermediate value.

A variation of this arrangement is sometimes called a linear variable differential transformer (LVDT) and sometimes called a periodic differential transformer. In an LVDT, there are provided a pair of interconnected coils which form the secondary winding. The primary winding is excited by a single phase source, but the output coils, which are oppositely phased, provide a pair of out of phase voltages. When the out of phase voltages are equal, the net output of the secondary winding is a null. When they are not, the net output voltage is non-zero and has either one of two discrete phases.

Variable transformers have been used in connection with nuclear reactor control systems. In a nuclear reactor, one or more moderators are provided for arresting to a lesser or greater extent the fission reaction of the fissionable material. Each moderator is connected to an end of a control rod which, in typical practice, is an elongated ferromagnetic shaft, usually made of stainless steel. The output power of the reactor is adjusted by driving the shaft to translate the moderator. The position of the moderator must be accurately known for safe and effective regulation of the output power.

In typical practice, the shaft, the moderator, and cooling water are enclosed in an elongated hermetically sealed chamber called a pressure vessel. In operation, very high temperatures, for example, 600°F, and very high pressures, for example, 2,000 psi, exist in the pressure vessel. Accordingly, it is impractical to sense the shaft position with conventional transducers inside the enclosure. Moreover, it is impractical to provide holes in the pressure vessel for signal leads and the like which would be necessary to connect internal transducers to external circuitry. Furthermore, it is impractical to monitor the position of the drive mechanism for the shaft and rely on that as an indication of shaft position. This is due to the nature of the drive motor, which has its rotor inside the pressure vessel and its stator outside the pressure vessel. Typically, the rotor has a threaded hole through which the shaft, which is also threaded, translates as the rotor rotates in response to a rotating magnetic field generated by the stator. Occasionally, the rotor slips in phase relative to the excitation signals for the stator, and, in this event, the shaft has a position different from the position that would be expected in the light of the manner in which the stator is excited.

The prior art variable transformer arrangements used in such systems have the advantage that they provide an indication of shaft position without any need for penetrating the pressure wall. However, such prior art arrangements suffer from a number of disadvantages such as non-linearity, temperature sensitivity, and the like. A major source of temperature sensitivity relates to the variations in the permeability of the shaft as a function of temperature. In a variable transformer, the variable-amplitude indicating voltage has an amplitude that is a function of the product of the permeability of the shaft and the shaft position. Accordingly, as the ambient temperature in the pressure vessel changes, the amplitude of the indicating voltage changes also, even though the shaft is atationary.

It is desirable to provide position indicating apparatus having the advantages of the variable transducer arrangement and having improved linearity and less temperature sensitivity.

SUMMARY OF THE INVENTION

In contrast to prior art arrangements like the variable transformers where the positional information inheres in the amplitude of a variable-amplitude oscillating signal, this invention provides apparatus where the positional information inheres in the phase of a variable-phase oscillating signal.

Briefly, the apparatus includes signal generating means for producing a variable-phase oscillating electrical signal, the phase of which uniquely indicates for a predetermined range of motion the position of a movable member. The apparatus also includes phase detecting and indicating means responsive to the variable-phase signal for producing a direct current signal having a magnitude that varies in accordance with changes in phase of the variable-phase signal.

Significantly, the apparatus is adapted to provide with respect to a ferromagnetic movable member positional information that is substantially independent of its permeability. To this end, the signal generating means includes means for producing a first oscillating electrical signal having an amplitude proportional to the permeability of the member and having a first constant phase relative to a reference phase. It also includes means for producing a second oscillating signal having an amplitude proportional to the product of the permeability and the position of the member and having a second, different, constant phase relative to the reference phase. Since each has an amplitude proportional to the permeability, a third oscillating signal, proportional to their vector sum, has relative to the reference phase a variable-phase which is substantially independent of the permeability and which is proportional to position. For this reason, temperature variations leading to variations in permeability do not adversely affect the accuracy of the positional information.

A preferred arrangement of this invention is adapted to indicate the position of an elongated, ferromagnetic shaft such as a control rod in a nuclear reactor. The shaft translates in an elongated chamber and the apparatus of this invention provides positional information without the need for penetration of the chamber. Each of a plurality of magnetic transducers is disposed at a successive one of a plurality of longitudinally spaced-apart locations adjacent the outside of the chamber. Each transducer has an input coil and a corresponding output coil. The input coils are excited by a multi-phase electrical source with each input coil being excited by a phase that is different from the phase exciting the input coil of an adjacent transducer. The excitation of the input coils generates a corresponding plurality of variable-strength magnetic circuits each having a path linking a different portion of the shaft travel. Each output coil responds to the strength of its corresponding magnetic circuit to provide a respective one of a plurality of variable-amplitude, constant-phase oscillating voltages. Each of these voltages has, depending upon the shaft position, either a minimum, a maximum, or a continuously variable intermediate amplitude. For any given shaft position, one of these voltages has an intermediate amplitude whereas each of the others has either the minimum or the maximum amplitude. Whichever transducer is providing the intermediate amplitude voltage is considered to be presently active, and successive ones of the transducers become active as the shaft translates from one end of its travel to the other. Any transducer providing the maximum amplitude voltage is considered to be presently saturated, and any transducer providing the minimum amplitude voltage is considered to be presently inactive. All the transducers on one side of the presently active transducer are presently inactive, and all those on the opposite side are presently saturated. In accordance with conventional mathematical analysis techniques, each voltage may be considered as a vector. For any given shaft position, the resultant of the vectors corresponding to the inactive and saturated transducers has a constant magnitude and a constant phase difference with respect to the vector corresponding to the active transducer. Moreover, the vector sum of this resultant and the vector corresponding to the active transducer is rotated with respect to the resultant in proportion to the intermediate amplitude. Accordingly, as the shaft translates from one end of its travel to another, successive ones of the transducer become active, an increasing number of the transducers become saturated, and the phase of the vector sum rotates in a substantially continuous manner. To implement this concept, the preferred arrangement includes summing means for forming a variable-phase oscillating signal proportional to the vector sum of all the oscillating voltages provided by the output coils.

BRIEF DESCRIPTION OF THE DRAWINGS

FIG. 4 comprises FIGS. 4A and 4B, FIG. 4A showing a plurality of vectors each corresponding to a different oscillating voltage and FIG. 4B showing the locus of a vector sum of the vectors of FIG. 4A which vector sum corresponds to a variable-phase oscillating voltage.

DETAILED DESCRIPTION

Figure 1:
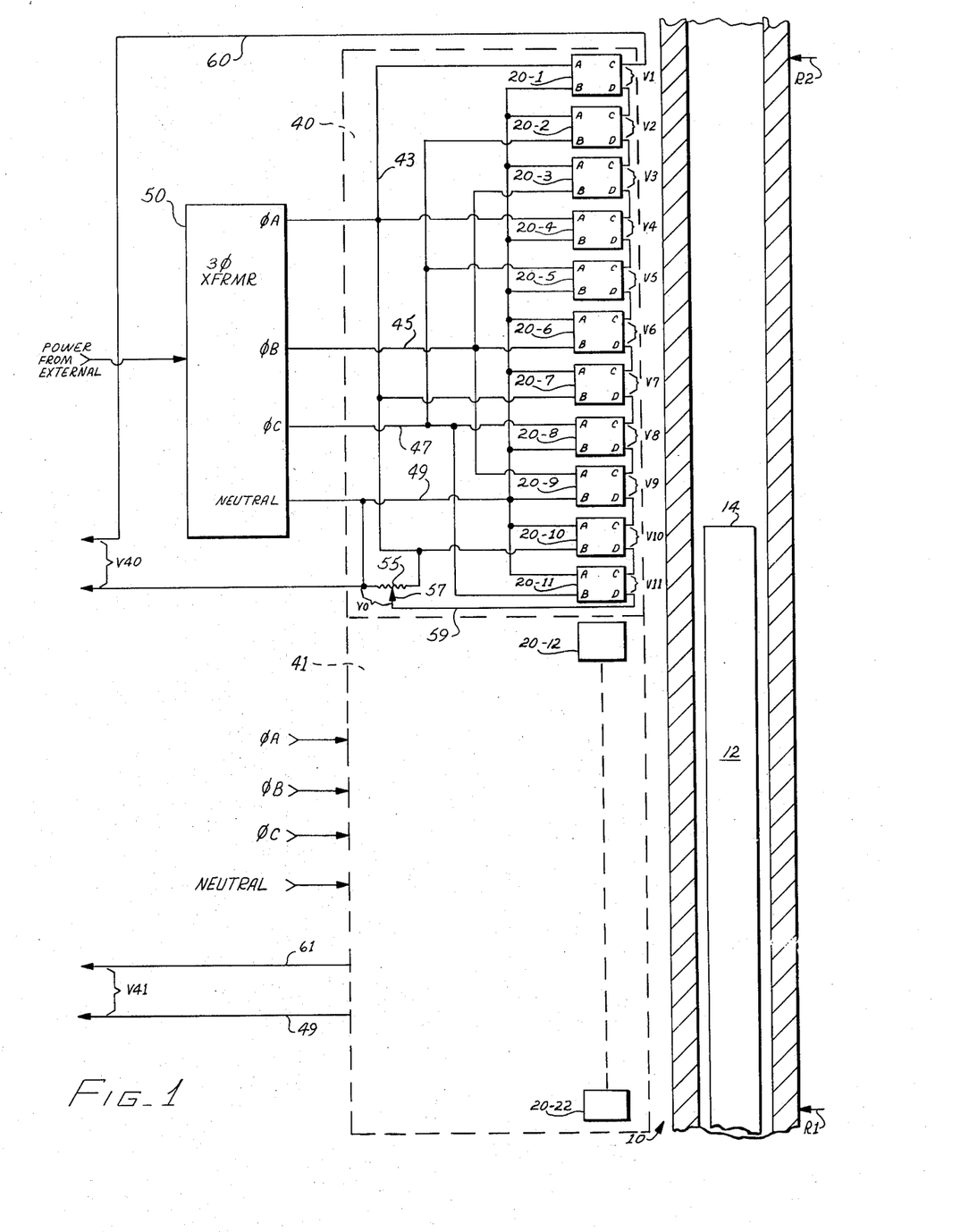
FIG. 1 shows a preferred arrangement of apparatus for providing a pair of variable-phase oscillating voltages each having a phase that indicates for a different range of its travel the position of a control rod in a nuclear reactor.

FIG. 1 shows in cross-section an intermediate portion of an elongated pressure vessel 10 for a nuclear reactor (not shown). The pressure vessel is a hermetically sealed chamber of generally tubular construction and preferably is made of a low permeability stainless steel such as 304 stainless steel.

A control rod 12 in the chamber is an elongated ferromagnetic shaft and preferably is made of a relatively high permeability stainless steel suCh as 403 stainless steel. The shaft end 14 is connected to a moderator (not shown) which is provided for arresting to a lesser or greater extent the fission reaction of fissionable material in the reactor. The output power of the nuclear reactor is adjusted by driving the shaft to translate the moderator. The shaft is driven by a conventional drive mechanism (not shown) of the type wherein a rotor of a stepping motor is rotatable in the chamber and the stator is arranged outside the chamber. The rotor is secured in the chamber such that it remains at a fixed location. That is, the rotor does not translate along the axis of the chamber. On the other hand, the shaft is secured so that it is not rotatable. As the rotor rotates, the shaft threads through an axial, threaded hole in the rotor in much the same way that a bolt threads through a nut. A control rod drive mechanism of this type is described in U.S. Pat. No. 3,619,675.

In the aspect of FIG. 1, the shaft translates either upwardly or downwardly along a line defined by its axis. Downward translation of the shaft moves the moderator to a position where the fission reaction is further arrested and the output power is decreased. Upward translation, on the other hand, causes the output power to increase.

The shaft has a path of travel defined by two terminal positions. In a first terminal position indicated at R1, no section of the shaft occupies the shaft travel. In the second, opposite terminal position indicated at R2, a shaft section extending longitudinally downwardly from the shaft end 14 fully occupies the shaft travel. In a specific example, the shaft travel is 132 inches. FIG. 1 shows the shaft in a position approximately midway in its travel.

For safe and effective regulation of the reactor output power, the position of the moderator must be known accurately. Owing to the direct relation between moderator position and shaft position, it is feasible to rely on an accurate measure of shaft position. However, for the reasons discussed above, it is impractical to use conventional position indication transducers such as potentiometers and the like to provide an indication of shaft position.

Figure 3:
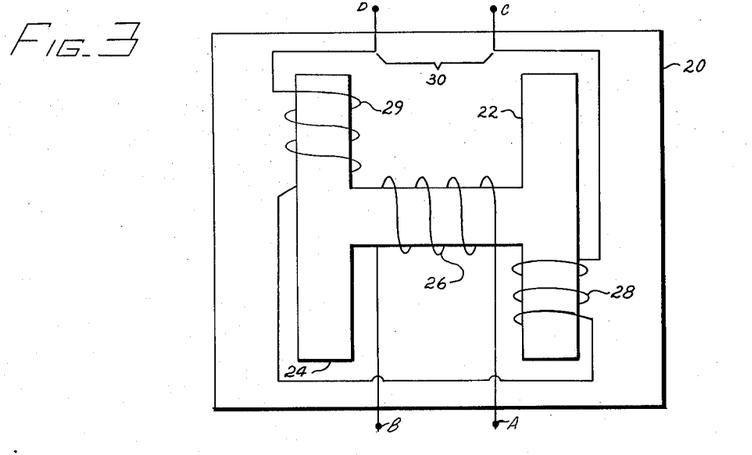
FIG. 3 shows the general configuration of an individual magnetic transducer used in the preferred arrangement.

Accordingly, the position of the shaft is sensed magnetically. FIG. 3 illustrates a magnetic transducer 20 which is one of a plurality of identically constructed transducers used for this purpose. The transducer includes a relatively high permeability core of preferably laminated construction. The core is generally H-shaped in cross-section. Accordingly, the core has one generally U-shaped portion 22 opening in one direction and an integral, generally U-shaped portion 24 opening in the opposite direction. An input coil 26 is wound around the cross-member of the H-shaped core. The input coil has opposite ends A and B. An output coil section 28 is wound around one of the tines of the U-shaped portion 24, and an output coil section 29 is wound around one of the tines of the U-shaped portion 22. Preferably, as shown, the tine within coil section 28 extends in one direction from one end of the cross-member, and the tine within the coil section 29 extends in the opposite direction from the opposite end of the cross-member. The output coil sections are connected in series to form the transducer output coil 30 which has opposite ends C and D.

In a specific example, the laminations are made of a 50% nickel, 50% iron, annealed material and are stacked to form a 0.375 inch thick core. Each tine is approximately 0.5 inch wide. The centerline of the tines are spaced apart by about 2 inches. The input coil has 650 turns and each output coil section has 1,300 turns. When the input coil is excited by a 13 volt rms sine wave, about 0.3 amps rms excitation current is drawn.

In response to excitation of the input coil, a magnetic circuit is developed having a path conforming to the shape of the U-shaped portion 22 and having a path linking the tines of that U. Accordingly, in the output coil segment 29, there is induced an oscillating voltage having an amplitude that is proportional to the strength (i.e., the flux density) of this magnetic circuit. At the same time, a magnetic circuit is developed having a path conforming to the shape of the U-shaped portion 24 and having a path linking the tines of that U. Accordingly, in the output coil segment 28, there is induced an oscillating voltage that is proportional to this magnetic circuit. The output coil segments are series connected in out of phase relationship so that the voltages induced in them tend to buck each other. Thus, when the two magnetic circuits have the same strength, the two induced voltages more or less cancel each other and the output voltage presented between the output coil ends C and D is a null or thereabout.

The strengths of these magnetic circuits are a function of the magnetic reluctances in the flux linking paths. The magnetic reluctance in turn depends upon the permeability of the medium through which the flux linking path extends. In one mode of operation of the transducer, for its full extent, the linking path for the U-shaped portion 22 extends through a relatively low permeability medium. Accordingly, in this mode, called the inactive mode, the magnetic field strength is a minimum. In another mode of operation, for substantially its full extent (i.e., except for air gaps, etc.), this linking path extends through a relatively high permeability medium. Accordingly, in this mode, called the saturated mode, the magnetic field strength is a maximum. In another mode of operation, for a portion of its full extent, this linking path extends through the relatively high permeability medium, and, for the remaining portion, it extends through the relatively low permeability medium. Accordingly, in this mode, called the active mode, the magnetic field strength has an intermediate value. In all modes of operation, the linking path for the U-shaped portion 24 extends through a relatively low permeability medium. Thus, in the inactive mode, the magnetic circuits have the same field strength, and the output voltage between the coil ends C and D is a null or thereabout. However, in the active mode and in the saturated mode, the field strengths differ. Accordingly, the voltage induced in the coil section 29 exceeds the voltage induced in coil section 28, and a net output voltage is developed between the coil ends C and D. The phase of this net output voltage is such that the voltage at end C measured with reference to end D has the same phase as the input voltage at A measured with reference to end B. The amplitude of this net output voltage varies from about 0 volts rms when the transducer is inactive to about 0.12 volt rms when the transducer is saturated.

As shown in FIG. 1, each of a plurality of identically constructed magnetic transducers is disposed at a successive one of a plurality of longitudinally spaced-apart locations adjacent the outside of the chamber. In the specific example wherein the shaft travel is 132 inches, there are 22 magnetic transducers (not all shown). Each transducer has its U-shaped portion 22 (not shown in FIG. 1) opening toward an associated portion of the shaft travel, each associated portion being 6 inches long. In each transducer, the tine around which coil section 29 is wound preferably is on the side closest to the reference position R1. The 22 transducers are organized into two groups 40 and 41 as indicated by the dashed blocks. The two groups are identical in structure; therefore, only group 40 is shown in detail.

Group 40 includes 11 transducers indicated as 20-1 through 20-11. Signal leads 43, 45, 47, and 49 and a transformer 50 connect the transducer input coils for excitation by a multi-phase electrical source (not shown). In a specific example, the transformer 50 is a 60 Hz, three-phase, step-down transformer and has a Y-connected secondary winding. In response to a multi-phase source of 480 volts rms, the transformer provides $\phi A$, $\phi B$, $\phi C$ excitation signals each of which has an rms magnitude of 13 volts with respect to the neutral. The signal leads 43, 45, 47, and 49 carry $\phi A$, $\phi B$, $\phi C$, and neutral voltages respectively. Considering the $\phi A$ excitation signal as a reference phase of 0°, the $\phi B$ excitation signal has a phase of 120°, and the $\phi C$ excitation signal has a phase of 240°.

Each input coil is excited by a phase that is different from the phase exciting the input coil of an adjacent transducer. For example, transducers 20-1 and 20-2 are adjacent and their input coils are excited by $\phi A$ and $\phi C$ respectively. That is, the A and B ends of the input coil in transducer 20-1 connect to signal leads 43 and 49 whereas the A and B ends of the input coil in transducer 20-2 connect to signal leads 49 and 45.

The excitation of the plurality of input coils generates a corresponding plurality of variable-strength magnetic circuits each having a path linking a different portion of the shaft travel. Each output coil responds to the strength of its corresponding magnetic circuit to provide one of a plurality of variable-amplitude constant-phase oscillating voltages V1 through V11. Consider for example transducer 20-11. For the shaft portion illustrated by way of example in FIG. 1, transducer 20-11 is presently saturated. It is presently saturated because a section of the shaft fully occupies a portion of the shaft travel corresponding to its location. Accordingly, the permeability of the shaft maximizes the strength of this transducer's magnetic circuit, and, as a result, maximizes the amplitude of the oscillating voltage V11 between the ends C and D of its output coil. The maximum amplitude is about 0.12V rms. The maximum amplitude depends upon the shaft permeability, the spacing between the transducer core and the shaft, and other similar factors. As will be discussed below, the actual value of the maximum amplitude is of minor importance. Accordingly, hereinafter, for simplicity of description and for aiding an understanding of the basic concepts underlying this invention, the even value of 1.0 volts rms will be attributed to this maximum amplitude. The phase of the voltage V11 measured at end C with reference to end D, is substantially the same as the phase of the voltage measured at end A (i.e., the neutral) with reference to end B (i.e., $\phi B$). A small difference between the actual phase and 60 degrees is attributable to a relatively small quadrature voltage induced in the output coil. This quadrature voltage is largely attributable to eddy currents generated in the chamber as a result of the oscillating magnetic field extending through it. Such eddy currents in turn cause the quadrature voltage to be induced in the output coil. By "quadrature" it is meant that this small voltage for transducer 20-11 has a phase angle of 90° with respect to 60°. Considered as a vector, the voltage V11 has a magnitude of 1.0 and a phase angle of 60°.

Consider as another example transducer 20-10. At this shaft position, transducer 20-10 is presently active.

It is presently active because an end section of the shaft partially occupies a portion of the shaft travel corresponding to its location. Accordingly, the amplitude of the oscillating voltage V10 between the ends C and D of its output coil has an intermediate value which is a function of the shaft position. Assume that the shaft end is 75 inches from the end position R1. In this event, proceeding downwardly from the shaft end 14, a 3-inch section occupies one-half of the 6-inch shaft travel portion associated with transducer 20-10 and a 72 inch section fully occupies the 12 contiguous 6 inch shaft travel portions associated with the transducers 20-11 through 20-22. With one-half of its associated shaft travel portion occupied by the high permeability shaft, the transducer 20-10 responds so that the amplitude of its output voltage V10 is about 0.5 volt. The phase of the voltage V10 measured at end C with reference to D is substantially the same as the phase of the voltage measured at end A (i.e., the neutral) with reference to end B (i.e., $\phi A$). Considered as a vector, the voltage V10 has a magnitude of 0.5 and a phase angle of 180°. The quadrature voltage for transducer 20-10 is of course at phase angle of 90° with respect to 180°.

Consider now transducer 20-9. At the illustrated shaft position, transducer 20-9 (and also transducers 20-8 through 20-1) is presently inactive. It is presently inactive because no section of the shaft occupies its corresponding 6 inch portion of the shaft travel. Accordingly, the amplitude of the oscillating voltage V9 between the ends C and D of its output coil is approximately at a null. Again, a small deviation from ideal performance is introduced by the relatively small quadrature voltage induced in the output coil. For transducer 20-9, this quadrature voltage has a phase of 90° with respect to 120°.

The absolute values of the amplitudes discussed above are given by way of example only and to a large extent are not important in the operation of the position indicating apparatus. It is the relative values of the amplitudes coupled with the phase differences that exist between the various oscillating signals that is significant. For example, a change in the ambient temperature in the chamber causing a change in shaft permeability will in turn affect the presently active transducer and all the presently saturated transducers in substantially the same way. For example, the maximum amplitude might increase 20% so that each presently saturated transducer provides 1.2 volts rms and so that the presently active transducer provides 0.6 volts rms. The relative phases, however, remain fixed.

A brief mathematical analysis follows to assist in understanding the operation of this invention. In this analysis, equations are formulated for two different cases, in each of which a resultant is defined by the sum of two vectors.

Consider for the first case, the resultant $\overline{R1}$ of a variable-magnitude vector $\overline{X}$ and a constant-magnitude vector $\overline{Y}$ where the angle between the vectors is such that $\overline{X}$ leads $\overline{Y}$ by 60°. The vector $\overline{X}$ has a variable magnitude $|X|$, and the vector $\overline{Y}$ has a constant magnitude $|Y|$. The magnitude and phase of $\overline{R1}$ is calculated in the following manner. First, let $|X| = k|Y|$ where $k$ is the ratio of $|X|$ to $|Y|$. Next, the components of $\overline{X}$ that are in phase and in quadrature with $\overline{Y}$ are calculated. The in phase component is $k|Y| \cos 60°$, and the quadrature phase component is $k|Y| \sin 60°$. The in phase component is added to $|Y|$ to give the length of the base of a right triangle, the altitude of which is given by the quadrature component. From trigonometry, it follows that the phase angle $\angle R1$ of $\overline{R1}$ relative to $\overline{Y}$ is given implicitly in the following equation:

$$\tan \angle R1 = k\sqrt{3}/2 + k$$

A plot of $\angle R1$ versus $k$ reveals that, for the range where $k$ varies between zero and unity, $\angle R1$ is substantially linearly proportional to $k$ and varies from 0° to 30°.

The magnitude $|R1|$ is given by the equation:

$$|R1| = |Y| (2 + k)/2 \cos \angle R1$$

A plot of $|R1|$ versus $k$ reveals that $|R1|$ varies from $|Y|$ to 1.7 $|Y|$ as $k$ varies from zero to unity.

The foregoing analysis shows that the resultant vector $\overline{R1}$ rotates to have a progressively increasing lead angle with respect to the constant-magnitude vector $\overline{Y}$ as the variable-magnitude vector $\overline{X}$ increases in magnitude.

By similar analysis, the magnitude and phase can be calculated for a second case of a resultant vector $\overline{R2}$ of a variable-magnitude vector $\overline{U}$ and a constant-magnitude vector $\overline{V}$ where the angle between the vectors is such that $\overline{U}$ leads $\overline{V}$ by 150°. The vector $\overline{U}$ has a variable-magnitude U, and the vector $\overline{V}$ has a constant magnitude $\overline{V}$. The ratio of $|U|$ to $|V|$ is $k$. The phase angle $\angle R2$ with respect to $\overline{V}$ is given implicitly in the equation.

$$\tan \angle R2 = k/2 - \sqrt{3}\,k$$

A plot of $\angle R2$ versus $k$ reveals that, for the range where $k$ varies between 0 and $\sqrt{3}/3$, $\angle R2$ is substantially linearly proportional to $k$ and varies from 0° to 30°.

Accordingly, the resultant vector $\overline{R2}$ rotates to have a progressively increasing lead angle with respect to the constant magnitude $\overline{V}$ as the variable-magnitude vector $\overline{U}$ increases in magnitude.

The magnitude $|R2|$ is given by the equation:

$$|R2| = |V|\,(2 - \sqrt{3}\,k)/\cos \angle R2$$

A special case of particular interest herein is where $|V| = \sqrt{3}$. In this case, $|R2| = 1.0$ for $k = \sqrt{3}/3$.

Figure 4A:
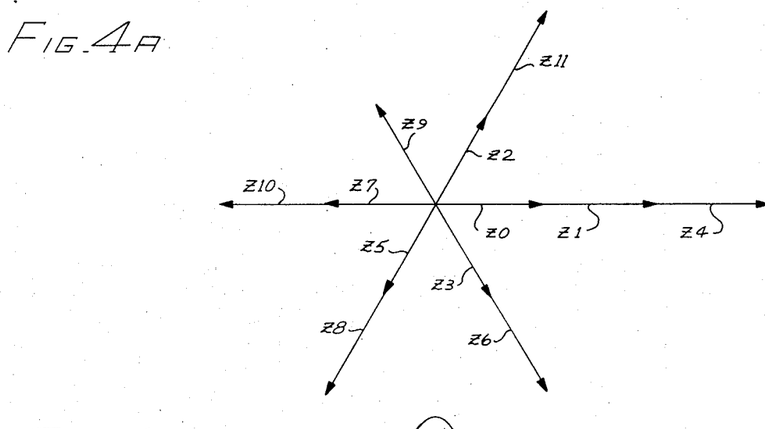

Consider now FIG. 4A which shows 12 vectors Z0 through Z11. The vector Z0 has constant magnitude, say unity, and has a reference phase of zero degrees. The other 11 vectors Z1 through Z11 have a magnitude that varies from zero to unity, and each corresponds to a different one of the oscillating voltages provided by the transducers 20-1 through 20-11.

Figure 4B:
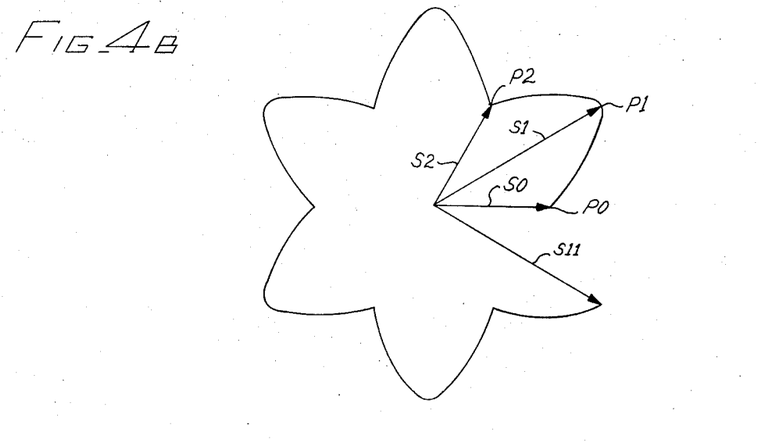

FIG. 4B is a plot of the locus of the vector sum of these 12 vectors. For any given point on the locus, one of the vectors Z1 through Z11 has an intermediate magnitude lying between zero and unity whereas each of the others has either zero or unity magnitude. Whichever vector has the intermediate value, like its corresponding transducer, is considered to be presently active. Successive ones of the vectors Z11 through Z1 become active as the vector sum moves along the locus. Any vector having unity magnitude, like its corresponding transducer, is considered to be saturated. Any vector having zero magnitude, like its corresponding transducer, is considered to be presently inactive.

At the point P0 of the locus, each of the vectors Z1 through Z11 has zero magnitude and does not contribute to the vector sum. Accordingly, the vector sum S0 is in phase with and has the same magnitude as Z0. At point P1 of the locus, each of the vectors Z1 through Z10 has zero magnitude, but Z11, which leads Z0 by 60° has unity magnitude. Accordingly, the vector sum S1 for the point P1 leads Z0 by 30° and has a magnitude of 1.7. And, in accordance with the first case given in the foregoing mathematical analysis, the vector sum rotates to have a progressively increasing lead angle with respect to Z0 for the portion of the locus P0 and P1.

At point P2 of the locus, each of the vectors Z1 through Z9 has zero magnitude, but Z10 and Z11 each has unity magnitude. As indicated in FIG. 4A, Z10 leads Z0 by 180°. Since the vector sum S1 leads Z0 by 30°, Z10 leads S1 by 150°. In accordance with the second case of the foregoing mathematical analysis, the resultant of Z10 and S1 (i.e., S2) leads S1 by 30° and has unity magnitude. Moreover, S2 leads Z0 by 60°.

In general, the vector sum rotates to have progressively increasing lead angle with respect to Z0 as each successive one of the vectors Z11 through Z1 becomes active and the cumulative total of presently saturated vectors increases. When all the vectors are presently saturated, the total vector sum of them (S11) leads Z0 by 330°.

With reference again to FIG. 1, a potentiometer 55 is arranged to provide an oscillating voltage V0 corresponding to the vector Z0. Opposite end terminals of the potentiometer are connected to signals 43 and 49 and the slidable tap 57 is adjusted so that V0 has an amplitude of about 1 volt rms. V0 is in phase with $\phi A$ and accordingly has a 0° phase angle.

To implement the summing of the oscillating voltages V0 through V11, the following interconnections are made. A signal lead 59 connects the tap 57 to coil end D in transducer 20-11 so that a portion of the potentiometer is in series circuit relationship with the output coil of transducer 20-11. The output coils of the transducers 20-11 through 20-1 are connected in series circuit relationship. And, a signal lead 60 is connected to the coil end C in transducer 20-1. Accordingly, there is developed between the signal leads 60 and 49, a voltage V40 which is the sum of oscillating voltages V0 through V11. The voltage V40 is a variable-phase oscillating voltage, the phase of which indicates the position of the shaft for the range of its travel between the midpoint and the terminal end R2. The group 41 is, as stated above, similarly organized and provides a voltage V41 between signal leads 61 and 49. The voltage V41 is a variable-phase oscillating voltage, the phase of which indicates the position of the shaft for the range of its travel between the terminal end R1 and the midpoint.

At the specific shaft position illustrated in FIG. 1, the shaft end 14 is 75 inches from the reference position R1. Accordingly, each of the transducers in group 41 is presently saturated. The phase of the voltage V41 is leading $\phi A$ by 330°. In addition, transducer 20-11 is presently saturated, transducer 20-10 is presently active, and each of the transducers 20-9 through 20-1 is presently inactive. The voltage V40 is the sum of the voltages V0 through V11. Consider a first partial sum which is the sum of the voltages V0 and V1. The first partial sum is a constant-amplitude, constant-phase oscillating voltage having an amplitude proportional to the permeability of the shaft. If the shaft permeability is such that the amplitude of V1 is 1.0 volts rms, then this partial sum has an amplitude of 1.7V rms. The partial sum has a phase angle of 30°.

Consider now a second partial sum which is the sum of the first partial sum and the voltage V10. Since transducer 20-10 is presently active, the voltage V10 has an amplitude that is proportional to the product of the permeability of the shaft and the shaft position. Under the assumed conditions of permeability and position, V10 has an amplitude of 0.5 volts rms. The phase angle of V10 with respect to $\phi A$ is 180° and with respect to the first partial sum is 150°. From following the equation, which has been discussed above, the phase of the second partial sum with respect to the first partial sum is calculated as follows:

$$\tan \angle R2 = k/2 - \sqrt{3}\,k$$

where $k$ equals the ratio of the amplitude of V10 (i.e., 0.5 volt) to the amplitude of the first partial sum (i.e., 1.7 volts).

Thus $\angle R2$ is 18°. Since the second partial sum leads the first partial sum by 18° and the first partial sum leads $\phi A$ by 30°, it follows that the second partial sum leads $\phi A$ by 48°. Moreover, since each of the transducers 20-1 through 20-9 is presently inactive, the total vector sum equals the second partial sum. Therefore, the present phase angle of V40 is 48°.

As was mentioned above, a small deviation from ideal performance is introduced by the quadrature voltages induced in the secondary coils. Along with the signal voltages, the quadrature voltages are summed and to a large extent tend to cancel out. It should be emphasized that the quadrature voltages have an amplitude that depends principally upon the resistivity of the chamber and that is substantially independent of shaft position. Accordingly, the effects of the quadrature voltage may be eliminated substantially completely by summing in a cancellation voltage of appropriate magnitude and phase. This summing can be effected in substantially the same way that V0 is summed in. The appropriate magnitude and phase of the cancellation voltage is preferably determined as follows. The shaft is positioned at reference position R1 so that all the transducers are presently inactive. Then the magnitude and phase of the voltage between terminal D of transducers 20-11 and terminal C of transducers 20-1 is measured. The cancellation voltage is preferably equal in magnitude to and opposite in phase from this measured voltage. To meet extremely high accuracy position indication requirements, it is advantageous to make this measurement at several different temperatures. (The measured voltage is somewhat temperature sensitive owing to temperature-caused variations in resistivity of the chamber.) Conventional temperature compensation techniques are known whereby the cancellation voltage can track the variations in the measured voltage. However, since the quadrature voltages are so small, it has been found necessary to provide this feature.

Figure 2:
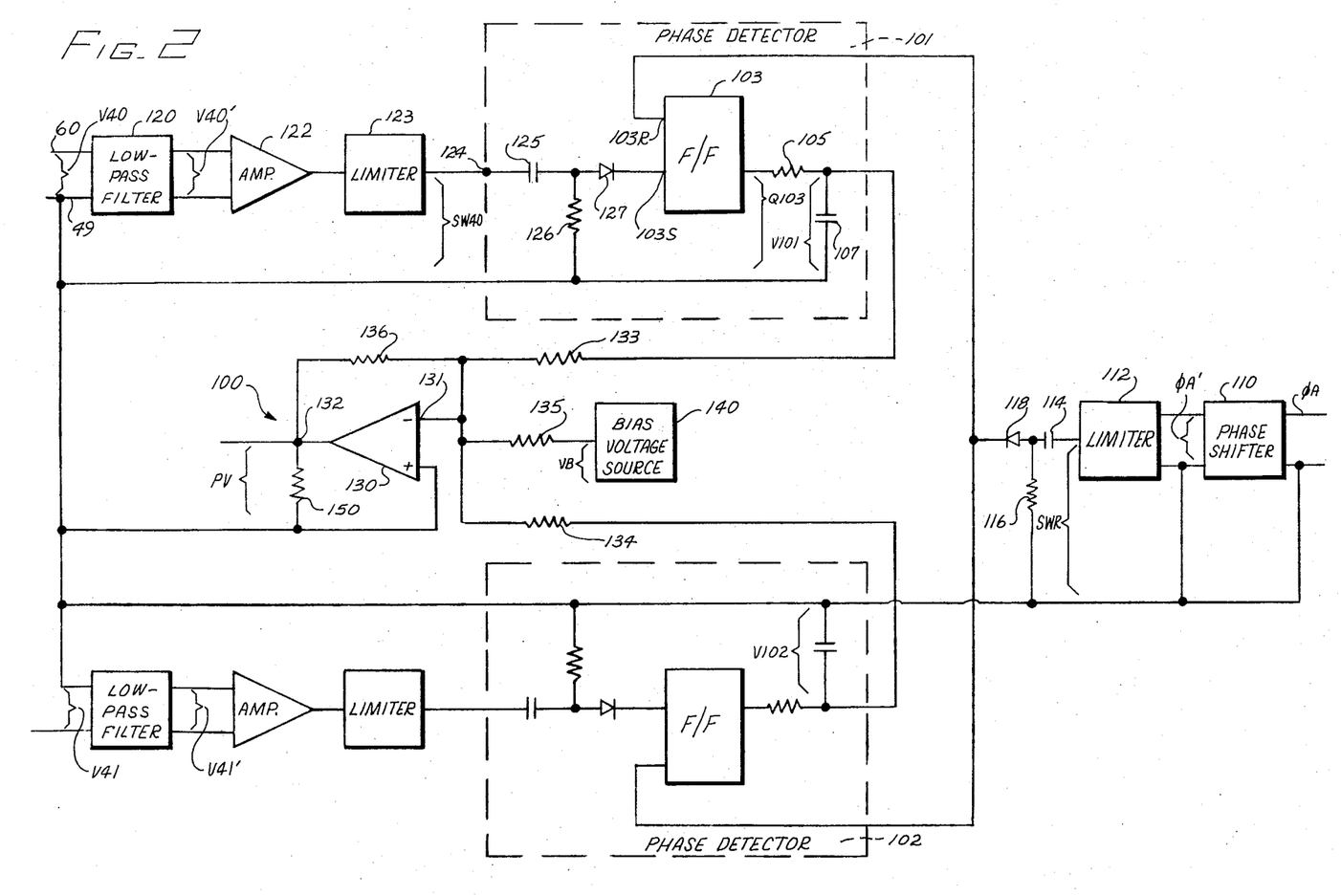
FIG. 2 shows, in block diagram form, signal processing electronics for converting the pair of variable-phase oscillating voltages into a direct current signal proportional to rod position.

FIG. 2 shows, in block diagram form, signal processing electronics for converting the variable-phase oscillating voltages V40 and V41 into a direct current signal PV. A conventional feedback amplifier circuit indicated generally at 100 produces the signal PV such that it is proportional to the sum of direct current signals V101 and V102.

Briefly, the signal V101 is produced in such a way that its magnitude varies in proportion to the difference in phase between the variable-phase signal V40 and the reference phase $\phi A$. In a specific example, V101 increases 25 millivolts (mv.) for each degree of phase difference. Similarly, V102 increases 25 mv. for each degree of phase difference between the variable-phase signal V41 and the reference phase $\phi A$. The variable-phase signal V41 has a phase that varies from 0° to 330° as the shaft end travels from the reference position R1 to the midpoint (i.e., a total of 66 inches in this example). The variable-phase signal V40 varies from 0° to 330° as the shaft end travels from the midpoint to the position R2 (i.e., also 66 inches in this example). While the shaft end lies between R1 and the midpoint, V40 has a constant phase angle of 0°, and, while the shaft end lies between the midpoint and R2, the V41 has a constant phase angle of 330°.

For the particular values of this specific example, the scale factor of each of the signals V101 and V102 is calculated as follows:

S.F. = 330°/66 inches · 25 mv/degree = 125 mv/inch

The gain of and biasing for the feedback circuit 100 are such that its output (PV) varies from +8.25 VDC to −8.25 VDC as the shaft moves from R1 to R2.

The arrangement of the circuitry for producing the signal V101 is identical to that for producing the signal V102, and, for this reason, only one is described in detail herein.

A phase detector 101 produces the signal V101. A flip-flop circuit 103 in the phase detector 101 has set (103S) and reset (103R) inputs and produces a binary valued signal Q103. In response to a positive trigger pulse applied to its set input, the flip-flop circuit 103 is set to a '1' state. In response to a positive trigger pulse applied to its reset input, the flip-flop circuit 103 is reset to its '0' state. While the flip-flop circuit 101 is in its '1' state, the signal Q101 is at a positive voltage level of 9 volts. While the flip-flop circuit 103 is in its '0' state, the signal Q103 is 0 volts.

The flip-flop circuit 103 is alternately set by pulses derived from V40 and reset by pulses derived from $\phi A$ so that Q103 defines a constant pulse repetition frequency pulse train of variable-width pulses. Q103 is applied to one end of a resistor 105. A capacitor 107 is connected between the other end of resistor 105 and ground (i.e., 0 volts). V101 is developed across capacitor 107.

The circuitry for deriving the positive pulses from $\phi A$ includes the following. A phase shift network 110 responsive to $\phi A$ produces $\phi A'$ such that $\phi A'$ lags $\phi A$ by about 20°. A conventional resistor-capacitor network is suitable for this purpose. A conventional limiter circuit 112 responsive to $\phi A'$ is driven by $\phi A'$ and, in response, produces a square wave SWR having the same phase as $\phi A'$. A differentiating network comprising capacitor 114 and resistor 116 is driven by square wave SWR and, in response, produces positive pulses for each positive-going transition and negative pulses for each negative-going transition. A diode 118 has its anode connected to the junction of capacitor 114 and resistor 116. Thus, the diode 118 is poled so that positive pulses are transferred through it to its cathode and negative pulses are blocked. The cathode is connected to apply the positive pulses to the 103R input of flip-flop circuit 103 and to the corresponding point in the phase detector 102.

The circuitry for deriving the positive pulses from V40 includes the following. A conventional low-pass filter 120 is provided for eliminating any high frequency noise such as harmonic distortion and the like from V40. The filter 120 received V40 via signal leads 60 and 49 and applies its output (V40') to a conventional amplifier 122. The filter 120 introduces a phase lag such that V40' lags V40 by about 10 degrees. Thus V40' has a variable phase that varies between −10° and +320° in accordance with shaft position. A conventional limiter circuit 123 is driven by the amplifier 122 and, in response, produces a square wave signal SW40 having the same phase as V40'. The square wave SW40 is applied to an input 124 of the phase detector 101. In the phase detector 101, a differentiating network comprising capacitor 125 and resistor 126 is driven by SW40 and in response, produces positive and negative pulses at opposite transitions of SW40. A diode 127 gates the positive pulses to the 103S input of flip-flop circuit 103 and blocks the negative pulses.

By virtue of the phase lags introduced by the filter 120 and the phase shift network 110, when V40 is in phase with $\phi A$, V40' leads $\phi A'$ by 10°, and, when V40 leads $\phi A$ by 330°, V40' leads $\phi A'$ by 340°. By virtue of the limiter circuit and differentiating network responsive to V40', a positive pulse sets the flip-flop circuit 103 to the '1' state on each positive-going zero crossing of V40'. By virtue of the limiter circuit and differentiating circuit responsive to $\phi A'$, a positive pulse resets the flip-flop circuit 103 to the '0' state on each positive-going zero crossing of $\phi A'$. The percentage of time in which the flip-flop circuit 103 is in the '1' state varies from 1/36 to 34/36. Accordingly, the constant prf pulse train defined by Q103 has 9 volt pulses which, expressed as a percentage of the full cycle, vary in width from 1/36 to 34/36. The average DC level of Q103 varies from 0.25 volt to 8.5 volts. By virtue of the smoothing effect of resistor 105 and capacitor 107, V101 varies in magnitude in accordance with this average.

The feedback amplifier circuit 100 includes a conventional operational amplifier 130 having a summing junction or inverting terminal 131 and an output terminal 132. Resistors 133, 134, 135, and 136 each has one end connected to the summing junction. V101 and V102 are applied to the other ends of resistors 133 and 134 respectively. A negative, constant voltage level VB is applied to the other end of resistor 135 by a bias voltage source 140. The resistor 136 is connected between the output terminal and the summing junction and serves as a feedback resistor for gain stabilization. A load resistance 150 is connected between the output terminal 132 and ground. The load resistance may, for example, be the resistance of a volt meter or other display device. PV is developed across the load resistance. By virtue of this arrangement, the magnitude of PV is the algebraic sum of V101, V102, and VB.

In a specific example, each of the resistors 133 through 136 has a resistance of 100K ohms and VB is −8.75 volts. Thus, when the shaft end is at the reference position R1, V101 and V102 each equals +0.25 volt, and PV equals +8.25 volts. As the shaft end moves between R1 and the midpoint, V102 increases 125 mv. per inch while V101 remains 0.25 volt. Thus at the midpoint, V101 equals +8.5 volts, V102 equals 0.25 volt and PV equals 0 volts. As the shaft end moves between the midpoint and R2, V101 increases 125 mv. per inch while V102 remains +8.5 volts. Thus at R2, V101 and V102 each equals +8.5 volts. Thus at R2, V101 and V102 each equals +8.5 volts and PV equals −8.25 volts.

What is claimed is:

1. Apparatus for indicating the position of a movable member, which comprises:
    signal generating means for producing a variable-phase oscillating electrical signal the phase of which uniquely indicates for a predetermined range of motion the position of the movable member, the signal generating means including means for simultaneously producing a plurality of variable-amplitude, constant-phase oscillating electrical signals, each associated with a different successive one of a plurality of contiguous portions of the predetermined range, having first and second limiting amplitude values, and varying therebetween in accordance with the position of the movable member while the movable member is in the associated portion, each pair of variable-amplitude signals associated with successive portions having a preselected constant phase between them, and means for forming the variable-phase signal from the variable-amplitude signals; and
    phase detecting and indicating means responsive to the variable-phase signal for producing a direct current signal having a magnitude that varies in accordance with changes in phase of the variable-phase signal.

2. Apparatus according to claim 1, wherein the movable member is a ferromagnetic shaft that translates an elongated chamber, and wherein the signal generating means includes a plurality of magnetic transducers each to be disposed at a successive one of a plurality of spaced-apart locations adjacent the outside of the chamber and each having an output circuit for providing a different one of the variable-amplitude, constant-phase signals.

3. Apparatus according to claim 2, wherein the output circuit of each transducer comprises a coil and the means for forming the variable-phase signal comprises means connecting the coils in series-circuit relationship.

4. Apparatus according to claim 2, wherein each transducer includes an input circuit and has a variable gain from the input circuit to the output circuit for producing the corresponding variable-amplitude signal in response to excitation of the input circuit by a constant-amplitude oscillating voltage.

5. Apparatus according to claim 2, wherein each transducer includes a magnetic core, a primary coil wound around the core and forming an input circuit, and a secondary coil wound around the core and forming the output circuit, and wherein each transducer has a variable gain from the input circuit to the output circuit for producing the corresponding variable-amplitude signal in response to excitation of the input circuit by a constant-amplitude oscillating voltage.

6. Apparatus according to claim 5, wherein each core has a generally U-shaped portion and is to be supported with the U opening toward the chamber, and wherein the gain from the input circuit to the output circuit has a first limiting value when there is a high magnetic reluctance path between the tips of the U, a second limiting value when there is a low magnetic reluctance path between the tips of the U.

7. Apparatus according to claim 6, wherein the means for forming the variable-phase signal comprising means connecting the secondary coils in series-circuit relationship whereby the variable-phase signal has the amplitude and phase of the vector sum of the plurality of variable-amplitude signals, and wherein the phase detecting means includes a limiter circuit and a phase detector circuit, the limiter circuit providing in response to the variable-phase signal a substantially constant-amplitude, variable-phase square wave voltage to the detector circuit, and the phase detector circuit providing the direct current signal which has thereby a magnitude independent of the amplitude of the vector sum.

8. Apparatus for indicating the relative position, with respect to a reference position, of a ferromagnetic movable member, which comprises:
    electrical-signal generating means including means for producing a first oscillating electrical signal having an amplitude proportional to the permeability of the movable member and having a first constant phase relative to a reference phase, means including a magnetic transducer for producing a second oscillating electrical signal having an amplitude proportional to the product of the permeability and the relative position of the movable member and having a second, different, constant phase relative to the reference phase, and means responsive to the first and second signals for forming a third oscillating electrical signal having a substantially continuously variable phase that is substantially independent of the permeability and is proportional to the relative position; and phase detecting means for producing a direct current signal having a magnitude proportional to the difference in phase between the variable-phase signal and the reference phase to provide an indication of the relative position.

9. Apparatus according to claim 8 wherein the movable member is a shaft translating in an elongated chamber, the apparatus being external to the chamber, and wherein the transducer means includes a magnetic core, a primary winding wound around the core for excitation by an oscillating voltage having a constant phase relative to the reference phase, and a secondary coil wound around the core for producing the second signal.

10. Apparatus according to claim 9, wherein the magnetic core has a generally U-shaped portion and is to be supported with the U opening toward the chamber, and wherein the transducer has from the primary winding to the secondary winding a variable gain that is a function of the permeability of the medium along a line between the tips of the U so that as the ferromagnetic shaft moves along the line the variable gain changes.

11. Apparatus for indicating the position of an end of an elongated, ferromagnetic shaft that translates in an elongated chamber, the apparatus being external to the chamber and comprising:

a plurality of magnetic transducers, each to be disposed at a successive one of a plurality of longitudinally spaced-apart locations adjacent the outside of the chamber, and each having an input coil and a corresponding output coil;

means for connecting the input coils for excitation by a multi-phase electrical source, each input coil being excited by a phase that is different from the phase exciting the input coil of an adjacent transducer, the excitation of the plurality of input coils generating a corresponding plurality of variable-strength magnetic circuits each having a path linking a different portion of the shaft travel;

each output coil responding to the strength of its corresponding magnetic circuit to provide a respective one of a plurality of variable-amplitude, constant-phase oscillating voltages each having a maximum amplitude while the shaft is in any position such that a section of the shaft fully occupies the corresponding portion of shaft travel and provides a low reluctance path which increases the strength of the magnetic circuit, having a minimum amplitude value while the shaft is any position such that no section of the shaft occupies the corresponding portion of shaft travel, and having an intermediate amplitude value while the end section of the shaft partially occupies the corresponding portion of shaft travel;

summing means for forming a variable-phase oscillating signal proportional to the vector sum of all the oscillating voltages provided by the output coils; and phase detecting means responsive to the variable-phase signal for producing a direct current signal having a magnitude that varies in accordance with the phase of the variable-phase signal.

* * * * *